United States Patent
Frutschi

(10) Patent No.: US 6,684,643 B2
(45) Date of Patent: Feb. 3, 2004

(54) PROCESS FOR THE OPERATION OF A GAS TURBINE PLANT

(75) Inventor: Hans Ulrich Frutschi, Riniken (CH)

(73) Assignee: ALSTOM Technology Ltd, Baden (CH)

( * ) Notice: Subject to any disclaimer, the term of this patent is extended or adjusted under 35 U.S.C. 154(b) by 58 days.

(21) Appl. No.: 10/003,418

(22) Filed: Dec. 6, 2001

(65) Prior Publication Data

US 2002/0134085 A1 Sep. 26, 2002

(30) Foreign Application Priority Data

Dec. 22, 2000 (DE) .......................... 100 64 270

(51) Int. Cl.[7] .............................................. F02C 7/00
(52) U.S. Cl. .......................... 60/772; 60/39.52
(58) Field of Search .......................... 60/39.52, 772, 60/774, 783

(56) References Cited

U.S. PATENT DOCUMENTS

| 4,434,613 | A | * | 3/1984 | Stahl | ........................ 60/39.52 |
| 4,498,289 | A | * | 2/1985 | Osgerby | ..................... 60/39.52 |
| 4,528,811 | A | * | 7/1985 | Stahl et al. | ................. 60/39.52 |
| 6,269,624 | B1 | * | 8/2001 | Frutschi | ..................... 60/39.52 |

* cited by examiner

Primary Examiner—Louis J. Casaregola
(74) Attorney, Agent, or Firm—Burns, Doane, Swecker & Mathis, L.L.P.

(57) ABSTRACT

A process is described for the operation of a gas turbine plant with $CO_2$ as working medium, in which in at least one combustion chamber hydrocarbons are combusted in a $CO_2$ atmosphere enriched with oxygen to flue gases, which largely consist of $CO_2$ and $H_2O$ and which are expanded within a turbine stage following the at least one combustion chamber, and are then compressed in a compressor stage and also at least partially condensed in a following condenser, so that at least portions of the $CO_2$ and $H_2O$ are liquefied and partially drawn off together with uncondensed flue gas constituents, and so that a main portion, not drawn off, of liquid $CO_2$ is compressed by means of a pump unit, preheated in at least one recuperator stage, and is again supplied to the combustion chamber. The invention is distinguished in that the compressed and preheated main portion $CO_2$ is pre-expanded to a combustion pressure and is supplied to the combustion chamber for combustion with the main portion $CO_2$.

8 Claims, 5 Drawing Sheets

PROCESS FOR THE OPERATION OF A GAS TURBINE PLANT

FIELD OF THE INVENTION

The invention relates to a process for the operation of a gas turbine plant with $CO_2$ as the working medium.

BACKGROUND OF THE INVENTION

Gas turbine plants with internal combustion and a quasi-closed circuit for $CO_2$ as working medium represent examples of a very promising, environmentally friendly technique for energy recovery or conversion. Differing from conventional gas turbine plants for energy recovery, in which fossil fuels are used and large amounts of $CO_2$ are released, gas turbine plants with a quasi-closed $CO_2$ circuit make it possible to considerably reduce the $CO_2$ emissions, and also emissions of nitrogen oxides, caused by the combustion of carbon-containing fuels in atmospheric oxygen. Thus in a known manner, the flue gases arising from the combustion process are cooled and by recirculation are supplied anew to the intake region of the gas turbine plant, with subsequent internal combustion. Such a recirculation, principally of $CO_2$ which results from the combustion process, can only take place to the extent to which the atmospheric oxygen also present within the combustion process is used up. If the combustion process is fed with atmospheric oxygen, the flue gases arising in the combustion remain mixed with atmospheric nitrogen, so that the $CO_2$ emission problem can however be only marginally reduced, and especially in this case the $CO_2$ is mixed with nitrogen oxides in the resulting flue gases and can only be isolated from the circuit with greater difficulty.

In order to solve the said nitrogen problem with simultaneous environmentally friendly elimination of $CO_2$, a gas turbine plant with a $CO_2$ process has been proposed, as schematically shown in FIG. 5. The quasi-closed, $CO_2$-charged gas turbine process shown in FIG. 5 has a combustion chamber 2 in which fossil fuel, for example natural gas ($CH_4$) via the supply duct 6, is combusted with the exclusive addition of pure oxygen $O_2$) through the supply duct 7. Since exclusively pure oxygen $O_2$ is used as the oxidant, and no atmospheric oxygen is combusted as a result no nitrogen compounds enter into the further combustion cycle. The flue gases 21 emerging from the combustion chamber 2 drive a gas turbine 3, which is connected by a shaft 19 to a generator 5 for current production. The flue gases 21 expanding within the gas turbine 3 emerge as exhaust gases 20 from the gas turbine 3 and, via an external cooling heat exchanger 13, arrive directly in a compressor 18 in which they are compressed and, after exiting the compressor 18, are fed to a condenser 4. The compressor 18 is arranged on the common shaft 19 with the turbine 3 and also the generator 5 in the embodiment example shown in FIG. 5. Before the exhaust gases compressed by the compressor 18 enter the condenser 4, a recuperative withdrawal of heat takes place by means of a heat exchanger 14, so that the conditions fall below the condensation point of $CO_2$ within the condenser 4 and the compressed and cooled $CO_2$ passes into the liquid state. Water can be optionally branched off at the condensation point by means of a control valve 10. Uncondensed gas portions are removed from the circuit process via a control valve 9 from the condenser 4 which has a heat exchanger 12, and furthermore a partial flow of the liquefied $CO_2$ is taken off via a control valve 8. The degree of charging, and thereby the power of the circuit process, can be controlled by the regulated tapping of $CO_2$ from the circuit. From environmental standpoints, by separating the $CO_2$ from the process by condensation, that state of aggregation of this gas is produced in which the $CO_2$ arising can easily be disposed of under environmentally friendly conditions, especially as concerns the problem of greenhouse gases.

The liquefied main portion of $CO_2$ which has not been branched off is compressed by means of a pump 1 and again supplied to the combustion chamber 2 in a correspondingly preheated and compressed form, via a duct 17 after passing through diverse recuperator stages 14, 15 and 16.

In order to be able to operate the above-described quasi-closed $CO_2$ process with technically reasonable efficiencies, it is appropriate to ensure a complete condensation of the whole of the $CO_2$. In order to be able to produce the liquid phase of $CO_2$ in the condenser 4, pressure conditions of between 60 and 70 bar must prevail in the connecting duct between the compressor 18 and the condenser 4. Such a high output pressure at the beginning of condensation of the $CO_2$ before entry into the condenser 4 leads, however, in the course of the compression by the pump 1 following the condenser 4, to an upper circuit pressure of 250–300 bar. Such a high pressure level is however not permissible within the combustion chamber, in view of the very high combustion temperatures which prevail there.

A further problem in the operation of the said gas turbine plants is represented by the extremely high heat capacity of highly pressurized $CO_2$, which likewise rises with increasing pressure conditions. Thus even the three recuperatively acting heat exchangers 14, 15 and 16 shown in FIG. 5 are not sufficient for the $CO_2$ flow, in order to heat the $CO_2$ to a corresponding preheat temperature before entry into the combustion chamber.

SUMMARY OF THE INVENTION

The invention therefore has as its object to further develop a process for the operation of a gas turbine plant with $CO_2$ as working medium, and also to develop a gas turbine plant of the said category related to this, so that the efficiency and the process parameters connected thereto are optimized within the quasi-closed $CO_2$ circuit. In particular, measures are to be found which aid in preventing an overloading of the combustion chamber as regards its operating conditions.

According to the invention, a process for the operation of a gas turbine plant with $CO_2$ as the working medium is disclosed. In at least one combustion chamber, hydrocarbons are combusted in a $CO_2$ atmosphere enriched with oxygen to flue gases. The flue gases largely comprise $CO_2$ and $H_2O$ and expand within a turbine stage following the at least one combustion chamber. The flue gases are then compressed in a compressor stage and also at least partially condensed in a following condenser such that at least a portion of the $CO_2$ and $H_2O$ is liquefied and partially drawn off together with uncondensed flue gas components. A main portion not drawn off of liquid $CO_2$ is compressed by means of a pump unit and preheated in at least one recuperator stage. The liquid $CO_2$ is then supplied to the combustion chamber and developed such that the compressed main portion of $CO_2$ is pre-expanded to a combustion pressure and, with the main portion $CO_2$, is supplied for combustion to the combustion chamber.

By the measure according to the invention, of pre-expansion of the main portion $CO_2$ compressed by the pump unit and typically at a pressure level between 250 and 300 bar after the pump unit, the high pressure level of the $CO_2$ can be reduced to pressure values between 70 and 100 bar so that a safe and efficient operation of the combustion chamber is ensured.

The pressure reduction typically takes place using a turbine stage within the quasi-closed $CO_2$ circuit, following the pump unit and effecting an efficient decompression of the $CO_2$ gases before they enter the combustion chamber.

The additional turbine stage is preferably arranged in the $CO_2$ circuit immediately upstream of the combustion chamber and effects the desired pressure reduction there. Between the pump unit and the previously sketched arrangement of the turbine stage, there is likewise preferably provided a multi-stage, for example three-stage, recuperator which preheats the $CO_2$ gases compressed by the pump unit to a temperature desired for the combustion. Recuperator stages serve for this purpose and provide for a specific heat transfer from the expanded hot gases emerging from the turbine stage immediately following the combustion chamber, and/or from the hot $CO_2$ gases emerging from the compressor stage before entry into the condenser, to the $CO_2$ gases entering the further turbine stage for pre-expansion.

BRIEF DESCRIPTION OF THE DRAWINGS

Preferred embodiments of the invention are disclosed in the following description and illustrated in the accompanying drawings, in which.

DESCRIPTION OF PREFERRED EMBODIMENTS

Figure 1:
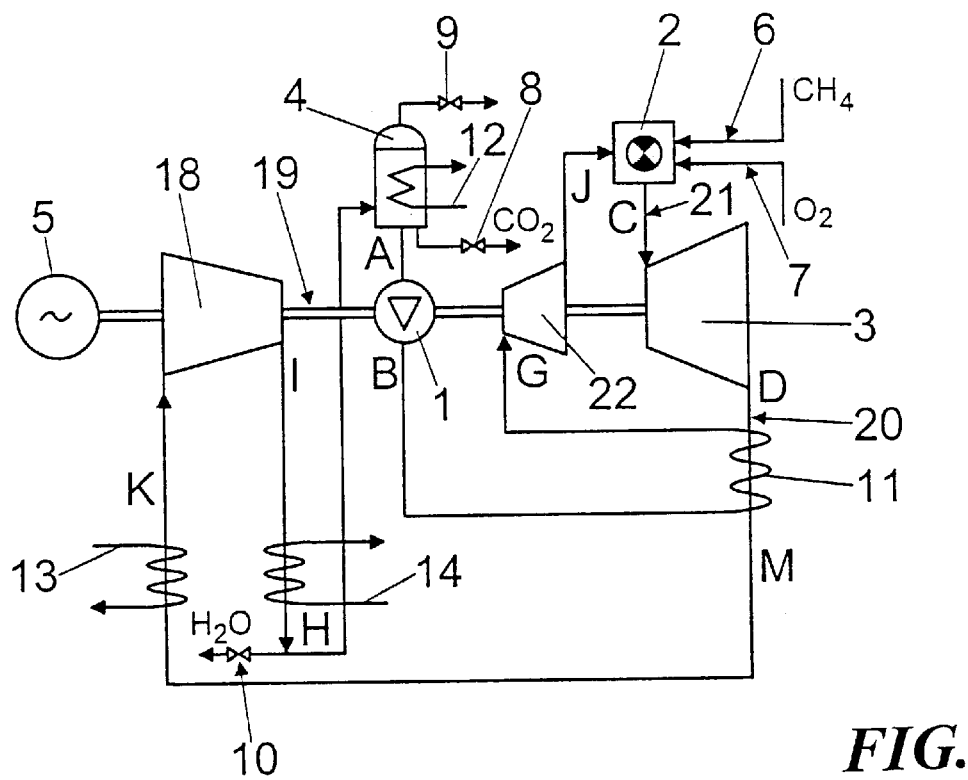
FIG. 1 is a diagram of a schematized $CO_2$ circuit with a recuperator stage in accordance with an embodiment of the invention.
Figure 5:
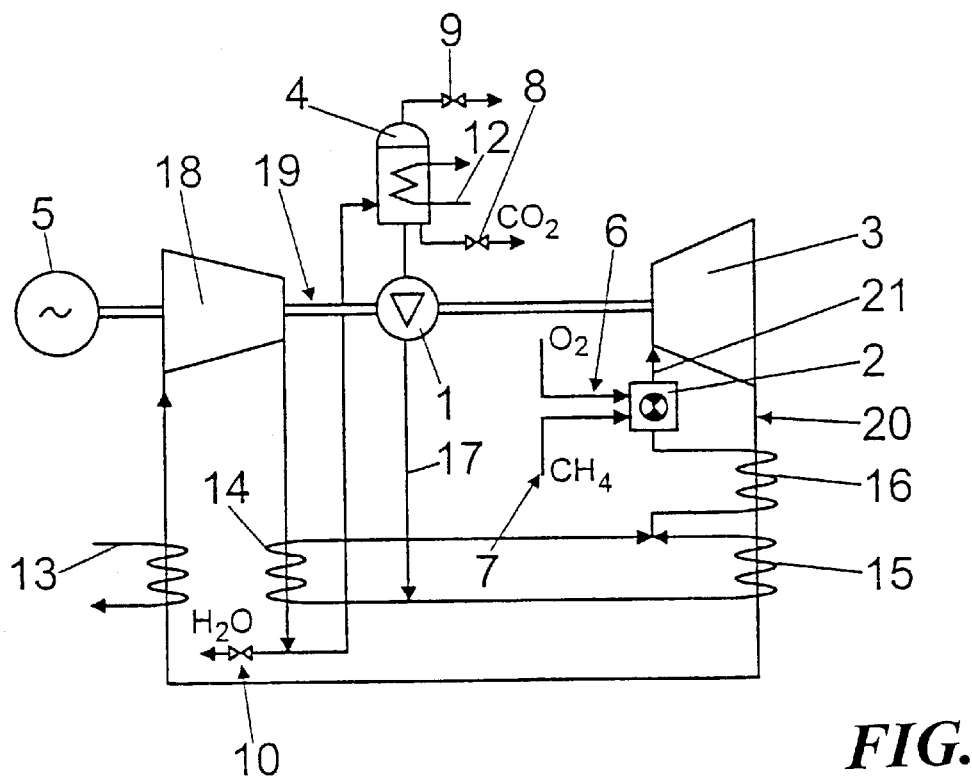
FIG. 5 is a diagram of a quasi-closed $CO_2$ circuit in accordance with the prior art.

A schematized circuit diagram of a quasi-closed $CO_2$ circuit is shown in FIG. 1, and substantially provides for a construction comparably similar to the $CO_2$ circuit described for prior art with reference to FIG. 5. In order to avoid repetitions, the reference numerals used in FIG. 1 refer to similarly named components which were already introduced and described with reference to FIG. 5. A new component of the gas turbine plant described in FIG. 1 is the further turbine stage 22, which is inserted into the quasi-closed $CO_2$ circuit between the pump unit 1 and the combustion chamber 2. The $CO_2$ gases, compressed to a high pressure after leaving the pump unit 1, are conducted through a heat exchanger unit 11 in which they are additionally heated by thermal coupling to the hot exhaust gases leaving the turbine stage 3 prior to entering the second turbine stage 22 for expansion. The $CO_2$ gases expand by the turbine stage 22 then reach the combustion chamber 2 at a pressure between 70 and 100 bar, where the $CO_2$ gases are available for further combustion.

The arrangement of the machine set shown in FIG. 1 can be constituted with a single shaft, as shown; that is, a common arrangement of the turbine stage 3, the further turbine stage 22, the pump unit 1, the compressor stage 18, and the generator 5, on a single shaft 19. Alternatively to this, it is also possible to arrange the turbine stage 3, the compressor 18, and the generator 5, or some other load to be driven, on a common shaft. On a separate shaft, the turbine 22 and the pump unit 1 could furthermore be coupled, and yet another load could be installed on the separate shaft, which preferably rotates with free rpm: for example, an electrical machine coupled via a converter.

Figure 2:
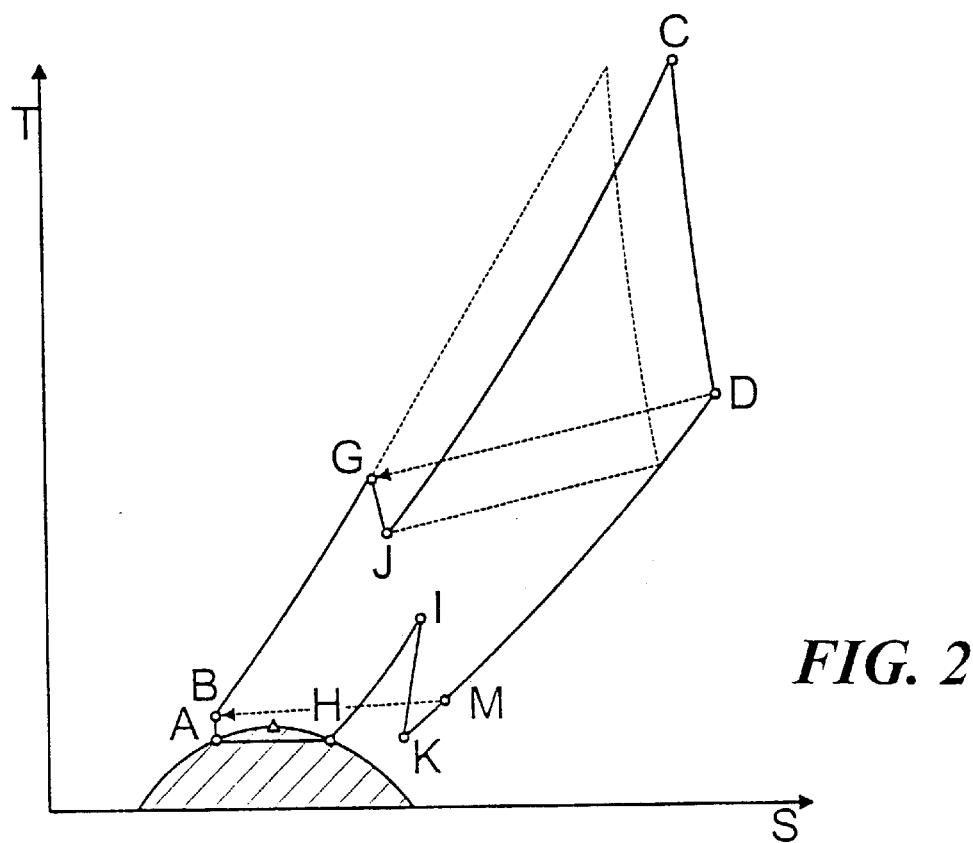
FIG. 2 is a T/S diagram for the circuit shown with respect to FIG. 1 in accordance with an embodiment of the invention.

A T/S diagram is shown in FIG. 2 which describes the thermodynamic properties of the $CO_2$ circuit shown in FIG. 1. The positions denoted by the letters A, B, C, D, K, 1, H, J and M in the diagram denote working points which correspond to those points indicated in FIG. 1. A characteristic magnitude is represented, for example, by the expansion step G–J, which leads on the one hand to a temperature reduction and likewise to a pressure reduction, so that the following combustion process J–C is to be carried out within technically permissible range limits. The course of the process drawn with dashed lines in FIG. 2 reproduces a combustion process which provides for no expansion preceding the combustion process, as shown in FIG. 5. It can be clearly seen that with the pre-expansion according to the invention, similarly high combustion temperatures are in fact attainable as with the conventional plant according to FIG. 5, but at a substantially lower pressure.

Likewise, clearly higher entropy values are attainable, which has the advantage that the combustion pressure within the combustion chamber is substantially reduced.

A fundamental point in the implementation of a quasi-closed $CO_2$ circuit with a technically acceptable efficiency is the attainment of the beginning of condensation of $CO_2$ before entry into the condenser 4. The beginning of condensation is defined by the working point H, which in the T/S diagram is a point of the envelope curve which delimits the liquefied state of the $CO_2$ (shaded region). In particular, the beginning of condensation H is attained by means of the pre-compression K–I in the subcritical gas phase with a following intermediate cooling I–H. In this manner it is possible to considerably reduce the proportion of the pressure ratio between B and A, i.e., the pressure rise produced by the pump unit 1, to the total pressure ratio B/K.

Figure 3:
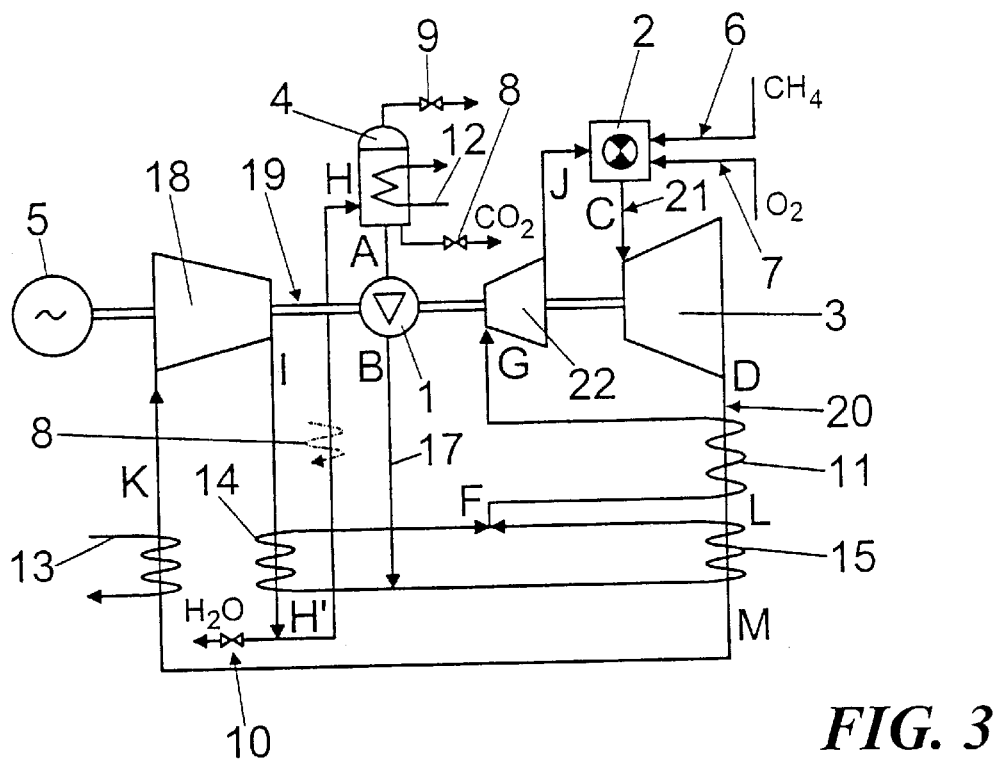
FIG. 3 is a diagram of a $CO_2$ circuit with three-stage recuperator unit in accordance with an embodiment of the invention.

In FIG. 1, the recuperator preheating of the $CO_2$ gases leaving the pump unit 1 before entering the turbine stage 22 consists solely of a single-stage recuperator 11, the preheating power of which is only limited, because of the high pressure ratios and, associated therewith, the high heat capacity of the highly pressurized $CO_2$. In order to effectively reduce the point G, i.e., the temperature deficit prevailing before entry into the turbine stage 22, the $CO_2$ circuit shown in FIG. 3 provides for a three-stage recuperator unit, consisting of three heat exchangers 11, 14 and 15.

Thus the heat exchanger 14 is capable of preheating a partial flow of the $CO_2$ gas flow coming from the pump unit, by means of the waste heat I–H'. The other partial flow of the $CO_2$ flow coming from the pump unit 2 undergoes its preheating by means of the heat L–M in a heat exchanger 15 arranged in parallel with the heat exchanger 14. The temperature at the point F is thus derived as a combined value of both preheatings.

Since the discrepancy of the specific heats between the low pressure side and the high pressure side due to the temperature rise of the $CO_2$ gases at the point F continues to become smaller, the further preheating from F to G takes place in a single heat exchanger 11, which uses the heat energy between D and L.

Figure 4:
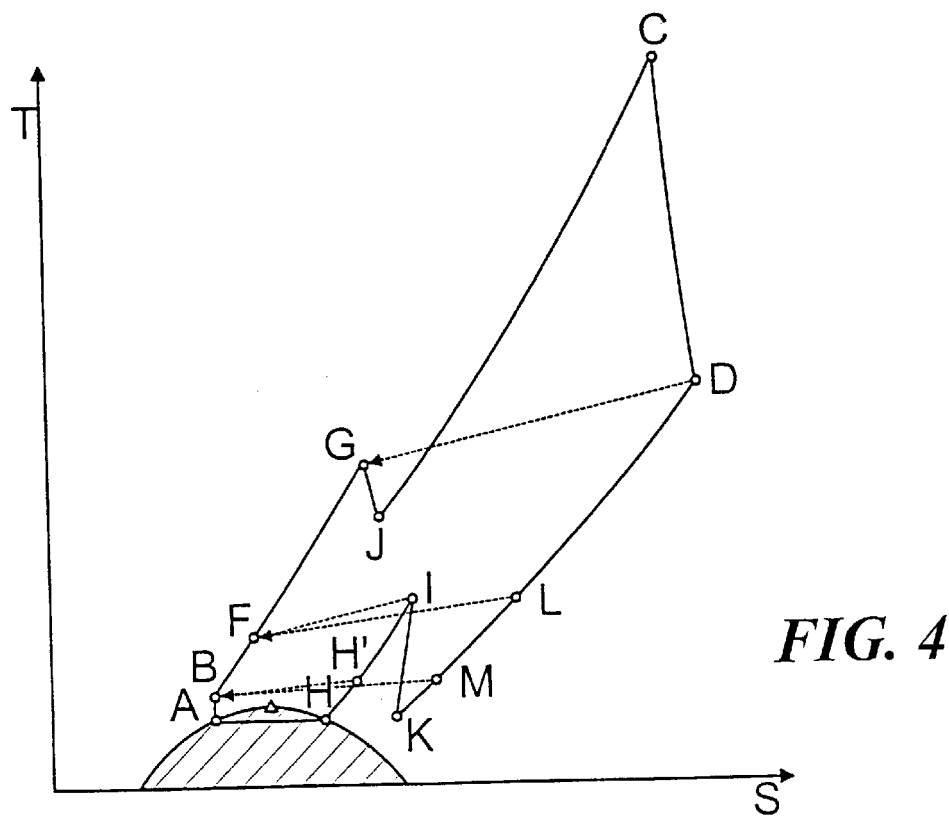
FIG. 4 is a T/S diagram for a quasi-closed circuit in accordance with an embodiment of the invention.

Due to these recuperative measures, the point G of the circuit according to FIGS. 2 and 4 experiences a higher temperature level than that of the circuit according to FIGS. 1 and 2, and this leads to a better efficiency of the whole process.

In an advantageous addition, an additional cooler 8' can be provided in the low pressure region of the $CO_2$ circuit, before the inlet into the condenser 4, and takes off additional heat as far as reaching the beginning of condensation of $CO_2$ at the point H, which heat could not be removed by the above-mentioned heat exchangers. A pre-cooler 13 is provided in order to minimize the power consumption of the compressor 18.

Figure 6:
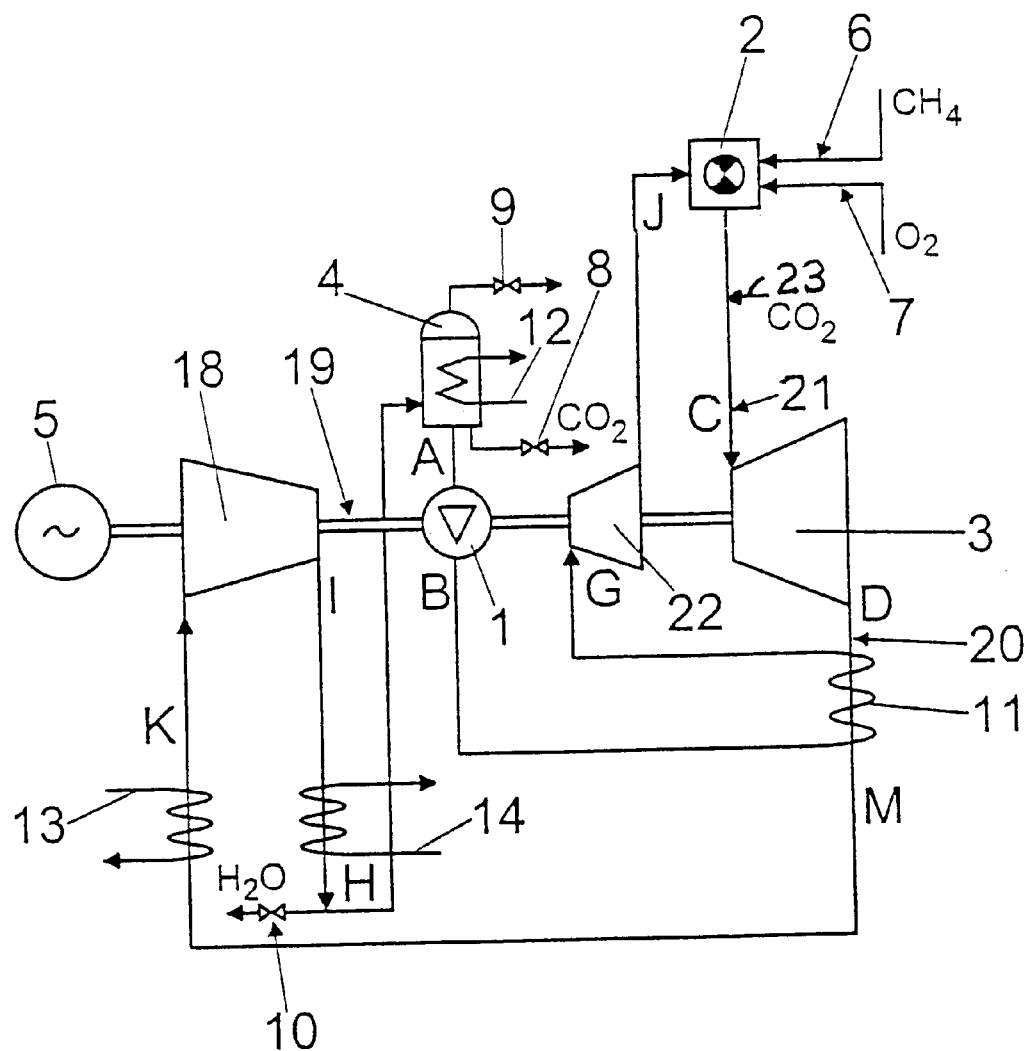
FIG. 6 is a diagram of a schematized $CO_2$ circuit with a recuperator stage and additional $CO_2$ injected between the combustion chamber and the turbine stage.
Figure 7:
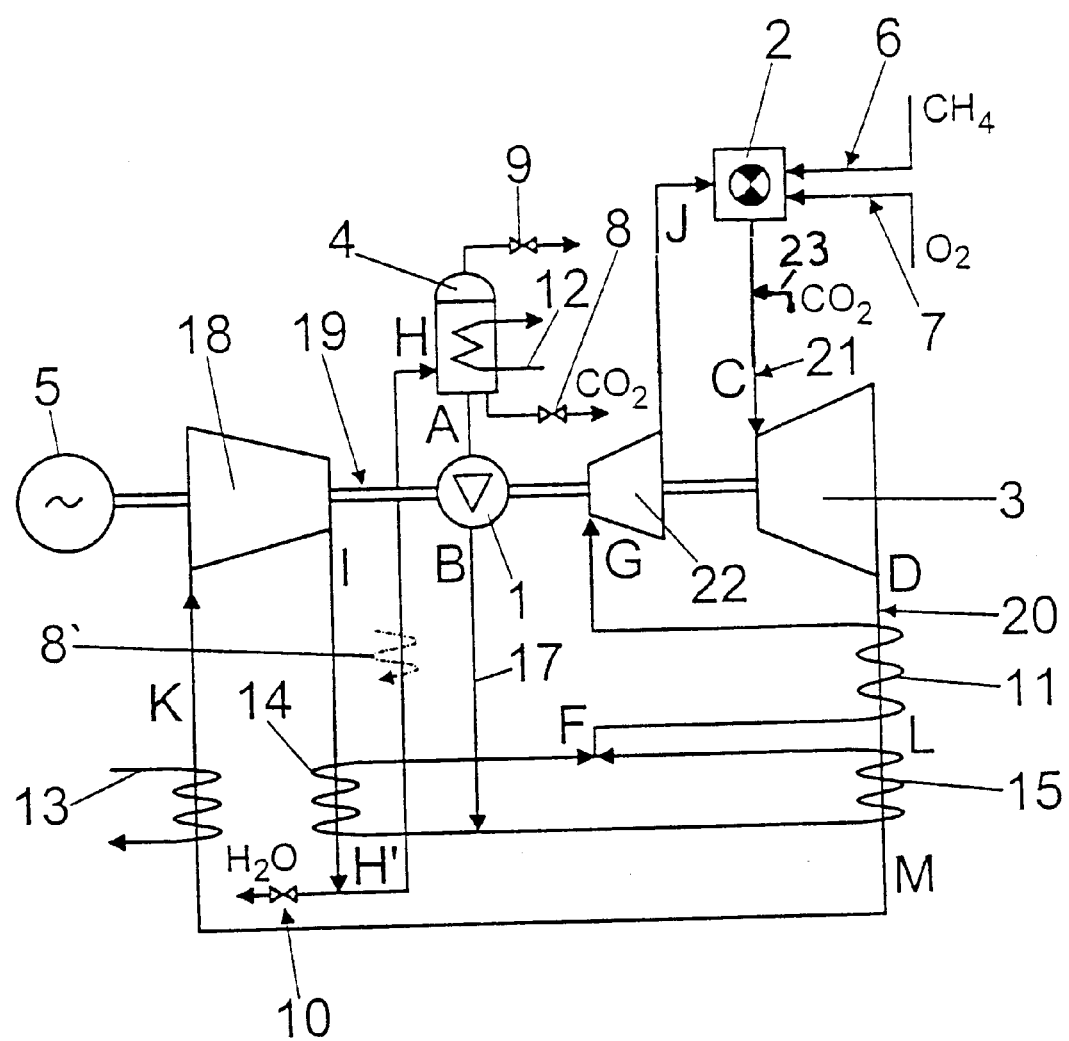
FIG. 7 is a diagram of another schematized $CO_2$ circuit with three-stage recuperator and additional $CO_2$ injected between the combustion chamber and the turbine stage.

Finally, it is possible to inject additional $CO_2$ for cooling purposes into the circuit between the combustion chamber and the turbine stage, in order to prevent overheating within the turbine stage 3 when excessively high combustion temperatures occur within the combustion chamber. This additional $CO_2$ is preferably taken from a place in the $CO_2$ circuit at which the $CO_2$ temperatures are correspondingly low. For example, in the embodiments illustrated in FIGS. 6 and 7, additional $CO_2$ 23 is injected into the flue gases 21.

What is claimed is:

1. A process for the operation of a gas turbine plant with $CO_2$ as the working medium, in which, in at least one combustion chamber hydrocarbons are combusted in a $CO_2$ atmosphere enriched with oxygen to flue gases, where the flue gases comprise $CO_2$ and $H_2O$ and the flue gases are expanded within a turbine stage following the at least one combustion chamber, the flue gases are then compressed in a compressor stage and at least partially condensed in a following condenser, so that at least a portion of the $CO_2$ and $H_2O$ is liquefied and partially drawn off together with uncondensed flue gas components, such that a main portion, not drawn off, of $CO_2$ is compressed by means of a pump unit, preheated in at least one recuperator stage, and is again supplied to the combustion chamber, wherein the main portion of $CO_2$ compressed by the pump unit is pre-expanded to a combustion pressure at which the main portion of $CO_2$ is supplied for combustion to the combustion chamber, wherein the combustion pressure is between 70 and 100 bar.

2. A process for operating a gas turbine plant, the gas turbine plant using $CO_2$ as a working medium, the process comprising:

combusting hydrocarbons to flue gases, the flue gases comprising $CO_2$ and $H_2O$ in at least one combustion chamber of the gas turbine plant, where the hydrocarbons are combusted in a $CO_2$ atmosphere enriched with oxygen;

expanding the flue gases within a turbine stage of the gas turbine plant where the turbine stage follows the at least one combustion chamber;

compressing the flue gases in a compressor stage of the gas turbine plant;

condensing the flue gases at least partially such that at least a portion of the $CO_2$ and the $H_2O$ is liquefied and partially drawn off together with uncondensed flue gas components;

compressing a main portion of the $CO_2$ with a pump unit of the gas turbine plant where the main portion of the $CO_2$ is a portion of the $CO_2$ not drawn off during the condensing operation;

preheating the main portion of $CO_2$ in at least one recuperator stage of the gas turbine plant;

pre-expanding the main portion of $CO_2$ compressed with the pump unit to a combustion pressure; and supplying the pre-expanded main portion of $CO_2$ to the combustion chamber at the combustion pressure, wherein the combustion pressure is between 70 and 100 bar.

3. A process according to claim 2, wherein the main portion of $CO_2$ compressed by the pump unit is pre-expanded to the combustion pressure after the compressed main portion $CO_2$ has passed through at least one recuperator stage.

4. A process according to claim 2, wherein the flue gases expanded by the turbine stage after compression are cooled before they are conducted to the compressor.

5. A process according to claim 4, wherein the compression and the cooling of the flue gases takes place such that a beginning of condensation of $CO_2$, a subcritical gas phase is attained before the flue gases enter the condenser.

6. A process according to claim 2, wherein the preheating of the compressed main portion of the $CO_2$ is carried out by heat exchange with the expanded flue gases leaving the turbine stage and/or with the compressed flue gases leaving the compressor stage, before the compressed main portion of the $CO_2$ is pre-expanded.

7. A process according to claim 6, wherein the expanded flue gases leaving the turbine stage before the compression by the compressor stage, and/or the compressed flue gases leaving the compressor stage before the condensation by the condenser, are cooled with additional cooling units.

8. A process according to claim 2, wherein $CO_2$ is admixed to the flue gases leaving the combustion chamber before entry into the turbine stage, and has a lower temperature than the flue gases.

* * * * *